United States Patent [19]
Matsepuro et al.

[11] Patent Number: 5,199,503
[45] Date of Patent: Apr. 6, 1993

[54] PLOW

[75] Inventors: Vadim M. Matsepuro, ulitsa Verkhnava, 14-16, kv. 50; Fedor N. Volkov, both of Moscow; Natalia I. Ashakova, Moskovskaya; Leonid S. Kuzmich, Moscow; Vladimir A. Semenov; Valery O. Mengo, both of Moskovskaya, all of U.S.S.R.

[73] Assignee: Vadim Mikhailovich Matsepuro, Moscow, U.S.S.R.

[21] Appl. No.: 798,832

[22] PCT Filed: Nov. 21, 1988

[86] PCT No.: PCT/SU88/00233
§ 371 Date: Jul. 23, 1990
§ 102(e) Date: Jul. 23, 1990

[87] PCT Pub. No.: WO90/05446
PCT Pub. Date: May 31, 1990

Related U.S. Application Data

[63] Continuation of Ser. No. 543,797, Jul. 23, 1990, abandoned.

[51] Int. Cl.$^5$ ................................. A01B 3/28
[52] U.S. Cl. .................... 172/221; 172/760
[58] Field of Search ............ 172/218, 219, 221, 618, 172/712, 161, 162, 771, 137, 760, 770, 765

[56] References Cited

U.S. PATENT DOCUMENTS

| 987,477 | 3/1911 | McKay | 172/221 |
|---|---|---|---|
| 2,672,801 | 3/1954 | Barrett, Jr. | 172/162 |
| 2,676,524 | 4/1954 | Bashor | 172/219 |
| 2,764,075 | 9/1956 | Fowler | 172/219 |
| 2,900,033 | 8/1959 | Coviello | 172/221 |
| 2,906,352 | 9/1959 | Lyle et al. | 172/221 |
| 2,916,096 | 12/1959 | Miller et al. | 172/221 |
| 2,916,097 | 12/1959 | Miller | 172/221 |
| 2,935,142 | 5/1960 | Miller | 172/221 |
| 3,186,496 | 6/1965 | Cox et al. | 172/219 |
| 3,305,025 | 2/1967 | Johnson | 172/218 |
| 4,165,787 | 8/1979 | Perkins | 172/219 |
| 4,800,963 | 1/1989 | Gomez | 172/219 |
| 4,869,327 | 9/1989 | Korf | 172/219 |
| 4,984,638 | 1/1991 | Coste | 172/221 |
| 5,000,267 | 3/1991 | Harrell | 172/219 |
| 5,024,281 | 6/1991 | Furlough | 172/219 |

FOREIGN PATENT DOCUMENTS

| 643998 | 10/1962 | Italy | 172/219 |
|---|---|---|---|
| 640688 | 6/1976 | U.S.S.R. | |
| 738528 | 9/1978 | U.S.S.R. | |
| 812199 | 7/1979 | U.S.S.R. | 172/219 |
| 912069 | 9/1979 | U.S.S.R. | |

*Primary Examiner*—Randolph A. Reese
*Assistant Examiner*—Spencer Warnick
*Attorney, Agent, or Firm*—Ladas & Parry

[57] ABSTRACT

The plow comprises a carrier frame (1) supporting a horizontally rotatable frame (3). The working members in the form of left- and right-handed plow bodies are fixed on the rotatable frame (3). The rotatable frame (3) is mounted in such a manner as to be swingable at one and the same angle ($\alpha$) in either direction with respect to a transverse vertical plane (5) drawn through the axis (6) of rotation of the frame (3). Each plow body includes a front part with a moldboard (8) having a share (9) and a rear part with mirror-image left and right moldboards (13) and (14). In order to reduce the interbody spacing of the plow bodies along the frame (3), the side edges (20, 21) of shares (9) are truncated or cut away to form an angle $\beta$ relative to the direction of plow travel (24) in the working position of the plow bodies. In another embodiment, the side edges of the shares (9) are not cut-away, the overhang L1 is retained, and the length of the share (9) is reduced; the lateral edges (22, 23) of the moldboard (8) are then made convex in shape.

5 Claims, 13 Drawing Sheets

PLOW

This is a continuation of copending application Ser. No. 07/543,797 filed on Jul. 23, 1990 now abandoned, International Application PCT/SU88/00233 filed on Nov. 21, 1988 and which designated the United States.

TECHNICAL FIELD

The invention relates to tillage implements, and in particular, to plows for moldboard plowing with the furrow slice cast aside both to the left and to the right during shuttle movement of the plow.

A plow in accordance with the invention may be attached to a tractor in combining implements even with a large plow width.

BACKGROUND OF THE INVENTION

Prior art plows used for the same purpose differ in structure, and each type has certain advantages. However, the interbody clearance between adjacent plow bodies in all such plows, which determines the plow length, is in excess of an admissible value which can ensure minimum overall length of the plow without disrupting normal operation of the plow, in particular, without interfering with the furrow slice passage between the plow bodies.

Known in the art is a widely used two-way plow comprising a carrier frame supporting a frame rotatable about the longitudinal axis which carries left-handed and right-handed bodies and moldboard jointers as well as colters and landsides attached to the bodies.

Therefore, the two-way plow differs from a normal hiller plow for carrying out a one-sided (normally, right-handed) dumping of furrow slices only in the provision of a rotatable frame and a double set of working members, the design and relative position of which determine the length of the two-way plow. The working members of the two-way plow correspond to the design and relative position of the working members of a hiller plow in which the interbody clearance is determined by the presence of a moldboard jointer throwing the cut top part of the furrow slice into an open furrow which is formed by the body positioned ahead thereof.

The need for a double set of working members in the two-way plow is a disadvantage, and certain technical solutions were sought for eliminating this disadvantage.

In plows which are free this disadvantage of the two-way plow is overcome in that the carrier frame supports a horizontally rotatable frame carrying plow bodies attached thereto, each plow body ensuring both left- and right-handed dumping of the furrow slice.

Known in the art are two types of plow bodies for such plows.

A body of the first type comprises an integral left- and right-handed moldboard having a pair of shares whose front tips are conjugated or separated by land edges. Depending on the desired direction of dumping of the furrow slice, the share is mounted to the left or to the right with respect to a leg of the body by means of a pivot joint having its pivot pin disposed at the intersection of the vertical plane of symmetry of the leg and the plane of symmetry of the moldboard.

This type of plow body is deficient due to enlarged linear dimensions of the moldboards in the vertical direction so that it is difficult to use such plow bodies for a large plow width. In addition, the configuration of the moldboards (cylindrical or conical) cannot be adapted for operation under all soil conditions.

It is preferred to have another type of plow body in the form of a composite body having front and rear symmetrical parts mounted for rotation for left-handed and right-handed dumping of the furrow slice.

Thus known in the art is a plow body having a leg in the front part thereof which supports front parts of the left- and right-handed moldboards with shares, which are mounted in the working position in a mirror-like relation relative to a transverse vertical plane drawn through the axis of rotation of the leg, the rear part of the body being configured as a freely rotatable concave cylinder.

However, the rear part of this plow body which is made shorter to reduce the interbody clearance in the plow, hence to reduce the plow length, results in a poor turning of the furrow slice, i.e. in a lower quality of plowing during operation of the plow.

Also known in the art is a plow body having a leg in its front part which supports a common left- and right-handed front part of a moldboard with a share which is symmetrical with respect to a plane extending through the axis of rotation of the leg and the middle of the share, the rear part supporting rear parts of left- and right-handed moldboards which are mounted in a mirror-like relation to each other. Depending on the desired direction of dumping of the furrow slice, the front and rear parts of the plow bodies are turned in such a manner that, upon an appropriate rotation of the frame, one of the side edges of the moldboard is in registry with the side edge of the rear part of a respective moldboard, whereby a full moldboard is formed for left- or right-handed dumping of the furrow slice (U.S. Pat. No. 3,305,025).

This plow body can easily comply with any requirements imposed upon plowing. However, the use of this plow body in a prior art plow having a horizontally rotatable frame cannot allow the plow length to be reduced due to a reduction of the interbody clearance to a value which is only determined by the furrow slice passage between the bodies, i.e. to the admissible value which is determined by purely process requirements.

The reason for this is that the rotatable frame of this plow is mounted on the carrier frame for pivoting about a vertical axis at the same angle in both directions, whereby, when the rotatable frame is mounted in the working positions, the rear parts of the plow bodies are turned in such a manner that the interbody clearance is limited by purely structural considerations because it is necessary to allow the rear parts of the plow body to be turned without interference with the bodies located therebehind, provided the plow does not have moldboard jointers and colters the use of which would make the plow length still larger.

Consequently, the plow having the horizontally rotatable frame has only one set of working members which makes it advantageous over a two-way plow from the point of view of material saving; at the same time, the need to ensure the turning of the furrow slice by each body alternately in both directions results in a complicated structure of the plow body and calls for the provision of an actuator means for setting the plow bodies to the working positions.

In spite of promising developments associated with the advent of manufacture of the plow having a horizontally rotatable frame, the problem of reducing its length while retaining the conventional parameters of the plow bodies and the use of moldboard jointers and colters could not be solved in such a plow because of disadvantages caused by the design of the rotatable frame.

Swinging of the frame at one and the same angle in both directions with respect to a longitudinal vertical plane is the main disadvantage not only of the abovedescribed plow, but of all conventional plows having a horizontally rotatable frame irrespective of the plow body type. It is this disadvantage that does not allow the interbody clearance in such plows to be reduced and shorter plows to be provided.

SUMMARY OF THE INVENTION

It is an object of the present invention to eliminate the above-mentioned disadvantages.

The main object of the invention is to provide a plow which such kinematics of the frame and working members which will reduce the length of the plow by positioning its bodies closer to one another.

These objects are accomplished by a plow comprising a carrier frame supporting a horizontally rotatable frame carrying working members attached thereto and including left- and right-handed plow bodies, and according to the invention, the rotatable frame is mounted for swinging at one and the same angle in either direction with respect to a transverse vertical plane passing through the axis of rotation of the frame.

In accordance with one embodiment of a plow according to the invention having plow bodies each consisting of a rotatable front part supporting a moldboard with shares symmetrical with respect to a plane passing through the axis of rotation and the middle of the shares, and a rear part supporting left- and right-handed shares which are mounted in a mirror-like relation to each other, according to the invention, the rear part of each plow body is mounted for rotation in either direction with respect to a vertical plane perpendicular to the frame at an angle $\phi = \alpha - \gamma$, wherein $\phi$ is the angle of rotation of the rear part of the plow body necessary for putting it in the working position;

$\alpha$ is the angle between the transverse vertical plane and the longitudinal axis of a rotatable frame in its working position;

$\gamma$ is the angle between the longitudinal vertical plane and plane of symmetry of the rear part of the plow body in its working position.

Another embodiment of the invention involves a design in which in a plow according to the invention having plow bodies each consisting of a front rotatable part supporting a moldboard with a share which is symmetrical with respect to a plane passing through the axis of rotation and the middle of the share, and a rear part supporting left- and right-handed moldboards which are positioned in a mirror-like relation to each other, according to the invention, the rear part of each plow body is rigidly secured to the rotatable frame.

The lateral edges of each share are preferably positioned at an angle with respect to the plow movement direction and are sharpened.

The lateral edges of the moldboard of each front part of the plow body are preferably made in the form of convex curves.

Each plow body preferably has a landside pivotally connected thereto and two abutments for turning the landside to a preset position.

The rotatable frame is preferably in the form of a parallelogram linkage having links operatively connected to the working members.

The plow according to the invention allows the interbody clearance, hence, the plow length to be minimized irrespective of the plow body type and presence of colters and moldboard jointers thereon thus enhancing maneuverability of and productivity of a plowing unit.

The gist of invention resides in the following.

A plow has a horizontally rotatable frame which is supported by the carrier frame in such a manner that is can set by means of a hydraulic cylinder or any another appropriate known means to working positions by way of a movement during which it intersects a transverse vertical plane passing through the axis of rotation of the frame. This movement of the rotatable frame results in a change of rotation of all working members to the opposite one unlike the frame movement in all prior art plows where the frame intersected a longitudinal vertical plane. As a result, when set to the working positions, the rear part of each plow body cannot come in contact with the front part of an adjacent plow body however close it may be. The colters and moldboard jointers will not come in contact with the plow bodies during their movement to the working positions.

In view of the above, the interbody clearance in the plow according to the invention is no longer determined by the plow body length and the presence of colters and moldboard jointers in the plow (there are no colters and moldboard jointers in prior art plows having a horizontally rotatable frame). For this reason, this clearance can be reduced to a value which is mainly dictated by the plowing process requirements, and by the need of the furrow slice passage between the plow bodies, if the process performed by each moldboard jointer should result in the top part cut thereby being left on the land surface and fall down into the open furrow under gravity simultaneously with the turning upside down and placing in the furrow of a slice cut by the plow body located behind.

Any type of plow bodies can be used in the plow according to the invention, but a composite body is preferred in which a front rotatable part supports of a moldboard with a share and a rear part supports left- and right-handed moldboards which are positioned in a mirror-like relation to each other. The composite body can have process parameters to meet various soil conditions and requirements imposed by the plowing process. When such a plow body is used, the smaller the angle $\alpha$, the position of the rotatable frame with respect to a transverse vertical plane in the working position of the plow, the smaller is the angle $\phi$, the rotation of the rear part of the plow body with respect to a vertical plane perpendicular to the frame. When angle $\gamma$, the position of the rear part of the plow body with respect to a longitudinal vertical plane, is equal to angle $\alpha$, the rear part of the plow body is rigidly secured to the rotatable frame. For example, with $\alpha = 40°$ and $\gamma = 40°$, the rear part of the plow body is rigidly secured to the rotatable frame, and in this case the plow body share will be positioned at an angle $\gamma_0$ close to 40° with respect to a furrow wall.

The angle $\alpha$ the position of the rotatable frame with respect to a transverse vertical plane decreases when the plow bodies are moved closer to each other. Therefore, the shorter the plow, the simpler it is to set the rear parts of said composite plow bodies to the working position.

Bringing the plow bodies together, hence, reducing the plow length may require a consecutive rotation of the front parts of the composite plow bodies and employment of a sopisticated drive means. In view of the above, it is preferred that the plow have shortened shares so that during setting of the plow to the working position, simultaneous (synchronous) rotation of the front parts of the plow bodies takes place, and their actuation means is simplified. The use of the shortened shares results in an incomplete cutting of furrow slices by the plow bodies in the horizontal plane so that a part of the slice is cut-off by the share and the other part is separated from the soil body by breaking-off. Depending on soil conditions, different degrees of incomplete cutting of the furrow slice can be permitted, which may be reduced or eliminated by using shortened and sharpened shares having their lateral edges positioned at an angle with respect to the direction of the plow movement.

In applications where incomplete cutting of the slice does not affect operation of the plow body, the configuration of the share of the composite plow body can remain unchanged. The lateral edges of the share in this case will coincide with the direction of movement which, given a reduction of the share length and symmetrical design of the front part of the moldboard, results in a decrease in its overhang, hence in an increase in steepness of its surface with respect to the furrow slice being dumped if the lateral edges of the front part of the moldboard are straight. A change in steepness of the front part of the moldboard and deviation from its optimum values can compromise plowing quality which is not desirable. For this reason, the use of a shortened share in composite plow bodies with the same configuration of the share calls for a change in configuration of the lateral edges of the front part of the moldboard which should be made in the form of convex curves. Separation of a furrow slice from the soil body by the plow body along a convex curve has other advantages: overturning of the furrow is enhanced and resistance to the plow body movement is decreased.

The provision of a pair of abutments of the front part of the composite plow body allows the front part to be used for turning a landside pivotally connected to the plow body to a preset position so that the means for turning the landsides on the plow can be simplified.

The possibility of movement of the rotatable frame during which it intersects a transverse vertical plane drawn through its axis of rotation makes it possible to provide the frame in the form of a parallelogram linkage in which distances between points located in lines that do not run in parallel with the longitudinal axis of the plow change upon rotation of the frame as they move along arcs of circles having different radii. This property of the parallelogram linkage allows it to be used for putting to working positions the plow bodies and moldboard jointers if they are operatively connected to rotatable links of the linkage and also for setting to working positions the colters and wheels if they are secured to the longitudinal links of the linkage.

The plow according to the invention has an overall length which is 2-2.5 times less than the length of any other prior art plow having the same plow width.

Investigation has shown that with a plow width of 3.5 m, a plow according to the invention of an overall length of 4.5 m can be compactly attached to a tractor in combining implements.

BRIEF DESCRIPTION OF DRAWINGS

The above objects and advantages of the invention will become apparent from the following detailed description of specific embodiments thereof showing a plow according to the invention in the accompanying drawings, in which.

BEST MODE FOR CARRYING OUT THE INVENTION

Figure 1:
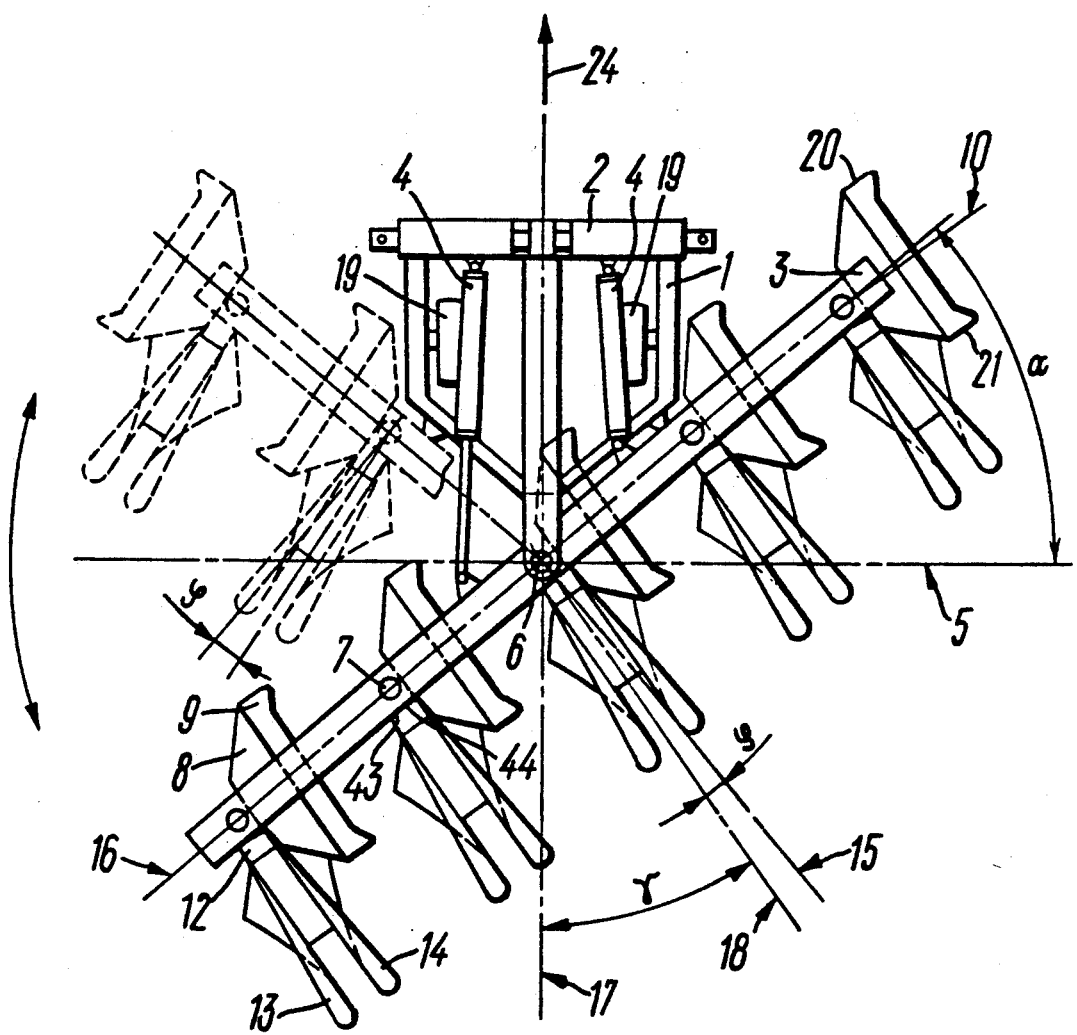
FIG. 1 is a diagrammatic plan view of a plow according to the invention, having composite plow bodies which have rotatable rear parts thereof.

A plow (FIGS. 1 and 2) consists of a carrier frame 1 having a device 2 for attaching it to a tractor. The carrier frame 1 supports a horizontally rotatable frame 3 and hydraulic cylinders 4 or any other appropriate known means for swinging the frame 3 at the same angle $\alpha$ in either direction with respect to a transverse vertical plane 5 drawn through an axis of rotation 6 of the frame 3, and for that purpose the frame 3 is mounted on the carrier frame 1 in such a manner as to be set in working positions by a movement during which it intersects the transverse vertical plane 5.

Left-handed and right-handed plow bodies are supported by the rotatable frame 3, each ensuring the turning of a furrow alternately in opposite directions.

Figure 2:
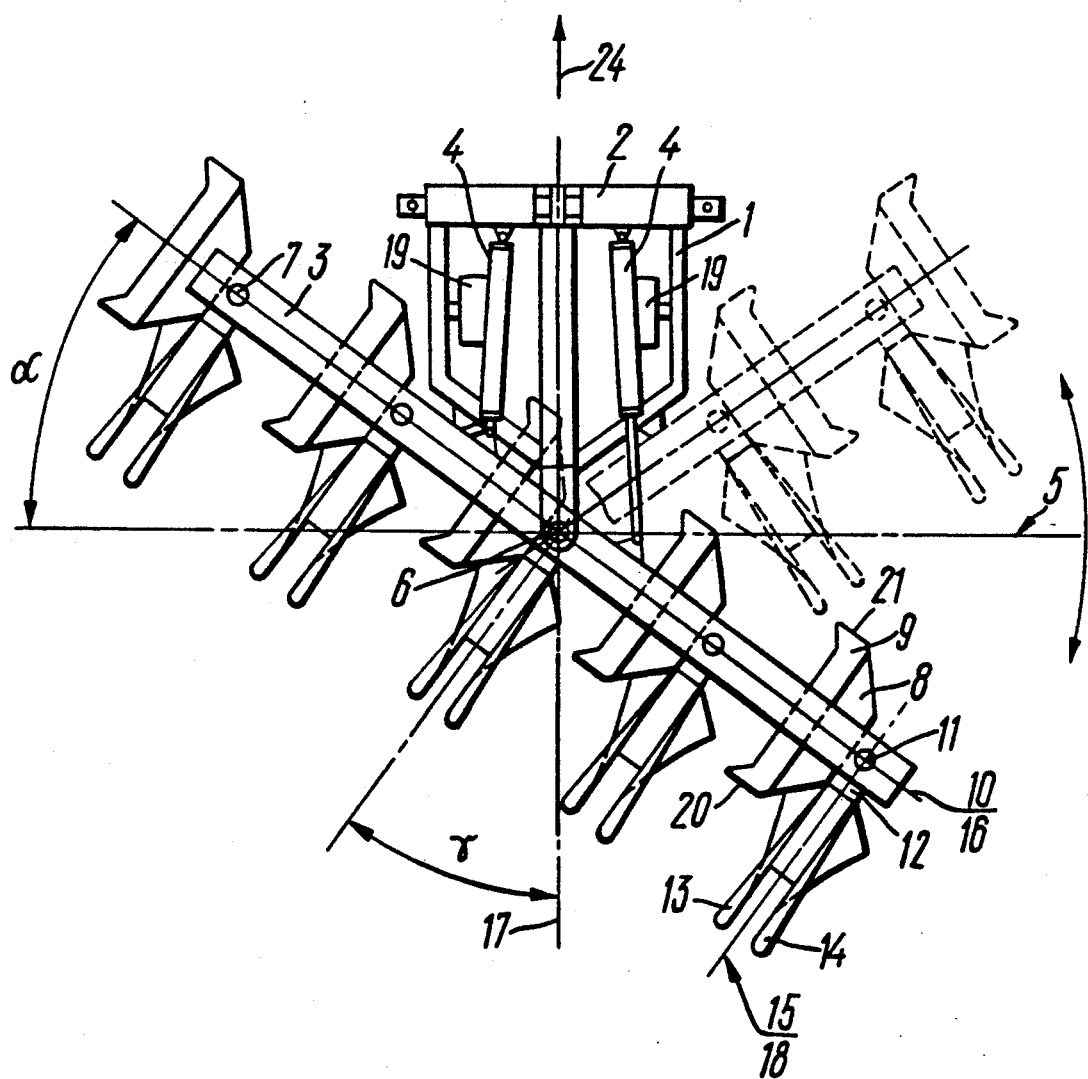
FIG. 2 is the plow shown in FIG. 1, with rigid attachement of the rear parts of the plow bodies.

The plow shown in FIGS. 1 and 2 has composite plow bodies each consisting of two parts: a front part and a rear part.

The front part of the plow body (FIGS. 3, 4, 5 and 6) consists of a leg or part 7 pivotally connected to the frame 3 and supporting a symmetrical part 8 of a moldboard with a share 9, which has a plane of symmetry 10 extending through a vertical axis 11 of rotation of the leg or part 7 and the middle of the share 9.

The rear part of the plow body consists of a leg 12 supporting parts 13 and 14 of left-handed and right-handed moldboards which are positioned in a mirror-like relation to each other. The leg 12 is connected to the frame 3 in such a manner as to ensure the setting of the rear part of the plow body to the working positions. If these positions are only to be ensured by the rotatable frame 3, the leg 12 is rigidly secured to the frame 3

Figure 4:
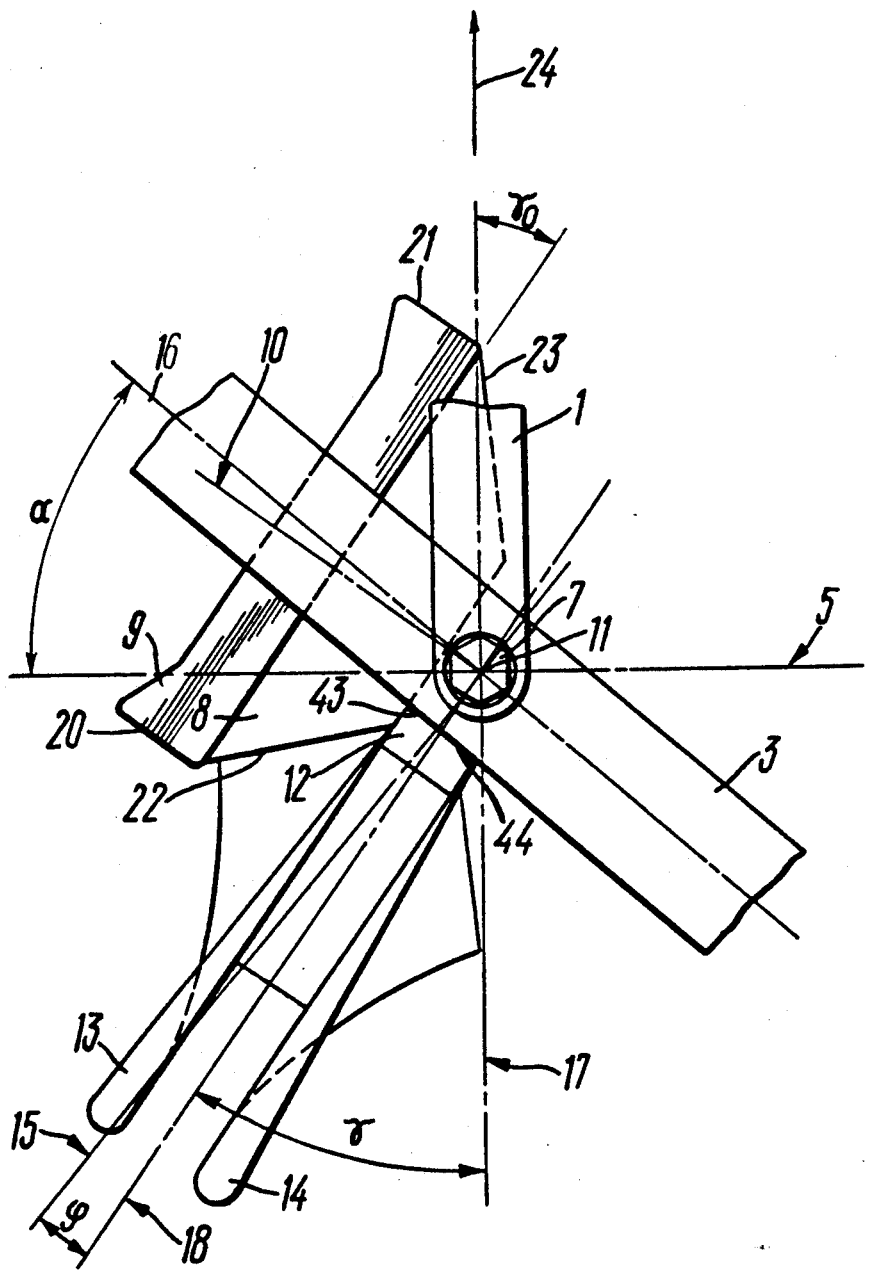
FIG. 4 is the plow body shown in FIG. 3, for the left-handed position.
Figure 5:
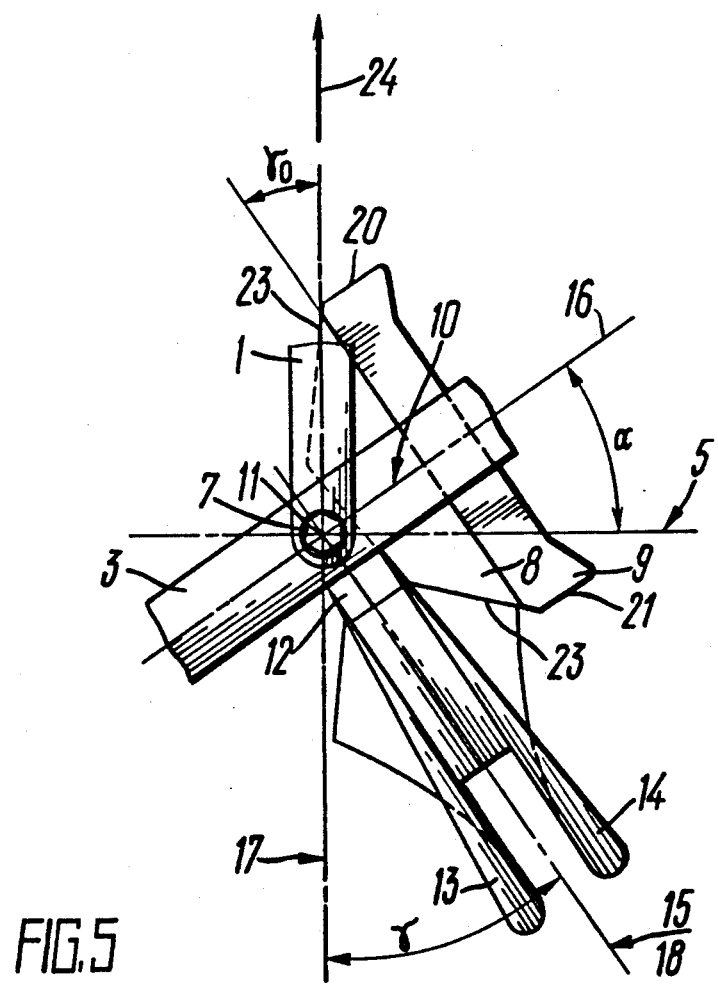
FIGS. 5 and 6 are plan views illustrating embodiments of a plow body with the rigid attachment of the rear part in the right-handed position.
Figure 6:
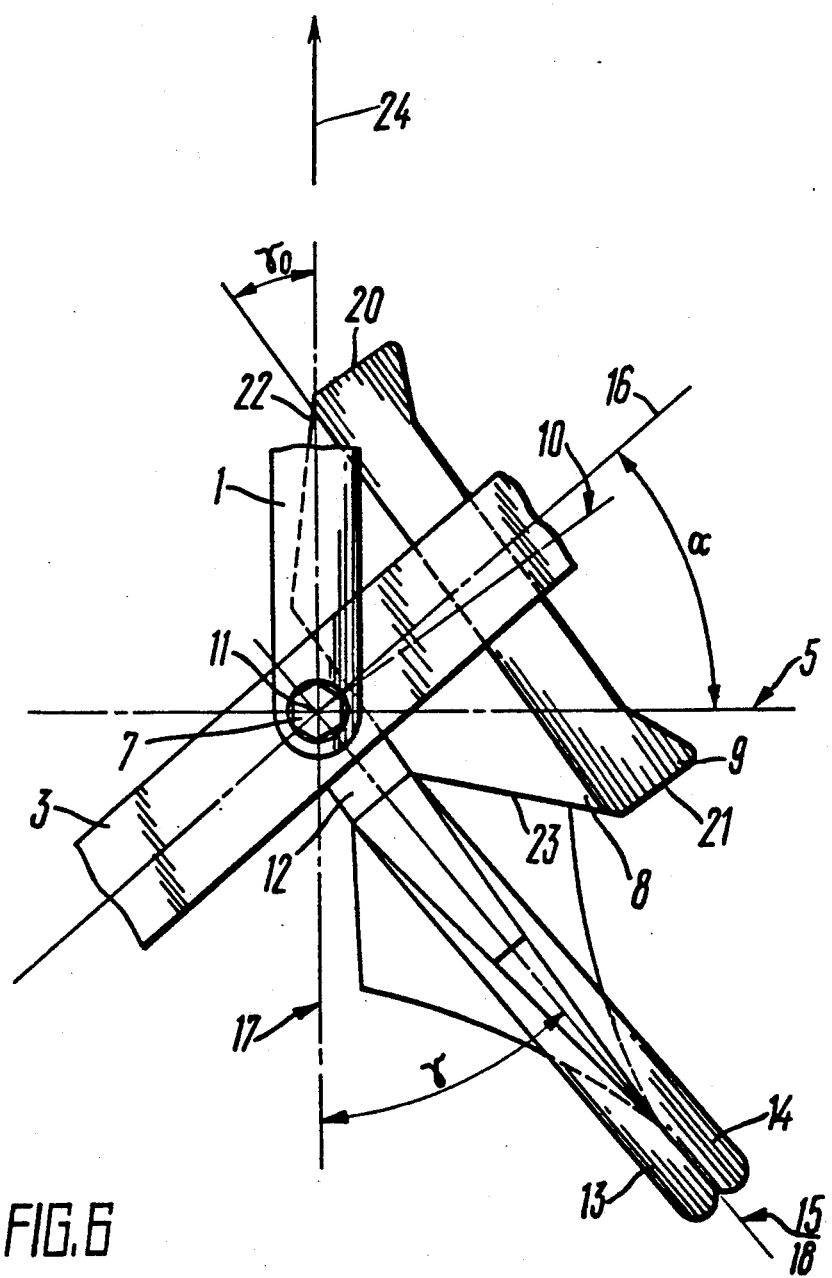
Figure 7:
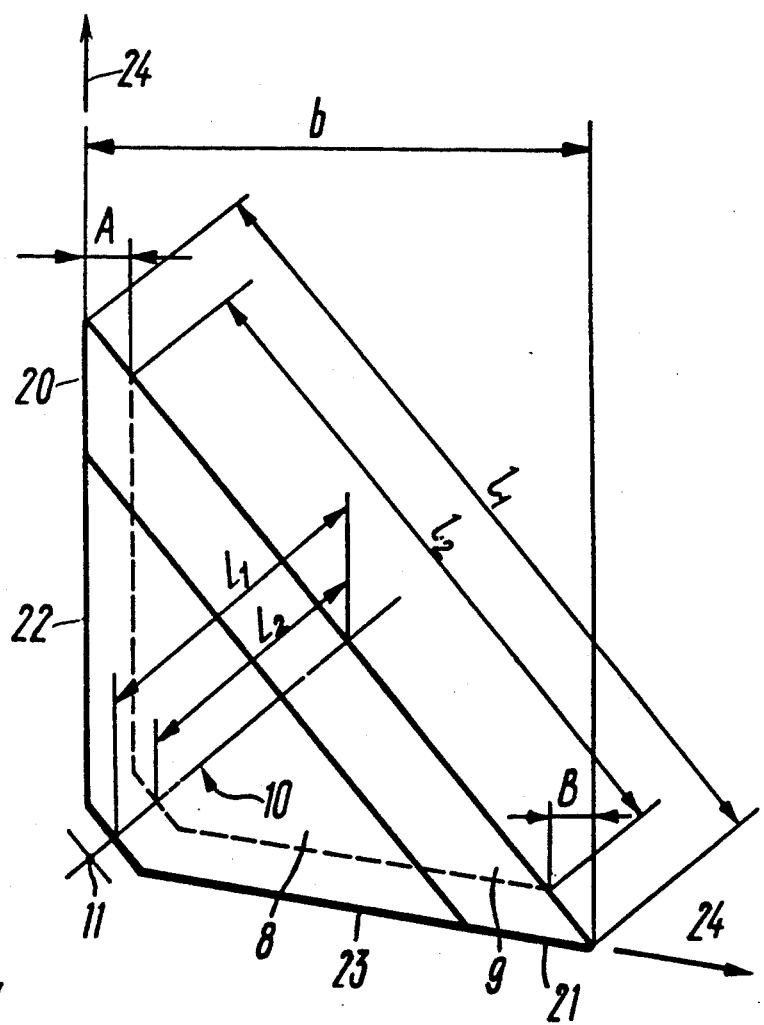
FIG. 7 is a diagram illustrating a reduction of overhang of the front part of a moldboard if the share length is reduced while retaining its configuration.

(FIGS. 2, 5 and 6). If rotation of the frame 3 cannot set the rear part of the plow body to the working positions, the leg 12 is mounted for rotation relative to frame 3 (FIGS. 1, 3 and 4) in either direction with respect to a vertical plane 15 perpendicular to the frame 3 at an angle $\phi = \alpha - \gamma$, wherein $\phi$ is the angle of rotation of the rear part of the plow body which is necessary to set the rear part to the working position; $\alpha$ is the angle between the transverse vertical plane 5 and longitudinal axis 16 of the rotatable frame in its working position; $\gamma$ is the angle between a longitudinal vertical plane 17 and a plane of symmetry 18 of the rear part of the plow body in its working position.

The symmetrical part 8 of the moldboard and the parts 13 and 14 of the left-handed and right-handed moldboards, when appropriately matched, form a full moldboard of the plow which ensures left-handed of right-handed turning of the furrow slice during operation of the plow.

For turning the front parts of the plow bodies to the working positions, the plow is provided with a conventional actuator means (not shown in the drawings). The rear parts of the plow bodies are turned to the working positions if necessary by any appropriate known means or under the action of furrow slices being dumped.

The plow has support wheels 19 (FIGS. 1, 2) which ensure a preset plowing depth.

The plow may have colters and moldboard jointers, each moldboard jointer carrying out the following process: the cut-off top part of the furrow slice is left behind the moldboard jointer on the land surface and falls down into the open furrow under gravity, simultaneously with the turning upside down and placing into the furrow of the furrow slice separated from the soil body by the plow body located behind. The employment of such a moldboard jointer does not require an increase in the interbody clearance as was the case with a moldboard jointer that had to throw the top part of the furrow slice cut thereby into the open furrow formed by the plow body located ahead thereof.

Owing to the provision of the rear part of the plow body which is rotatable in either direction with respect to the vertical plane 15, this composite body can have optimum dimensions as they become independent of the angle $\alpha$. As a result, plow bodies with various parameters can be used in one and the same plow (having a certain working position of the rotatable frame 3 and arrangement of the plow bodies on the frame 3), whereby the plow can be used under any soil conditions.

Figure 3:
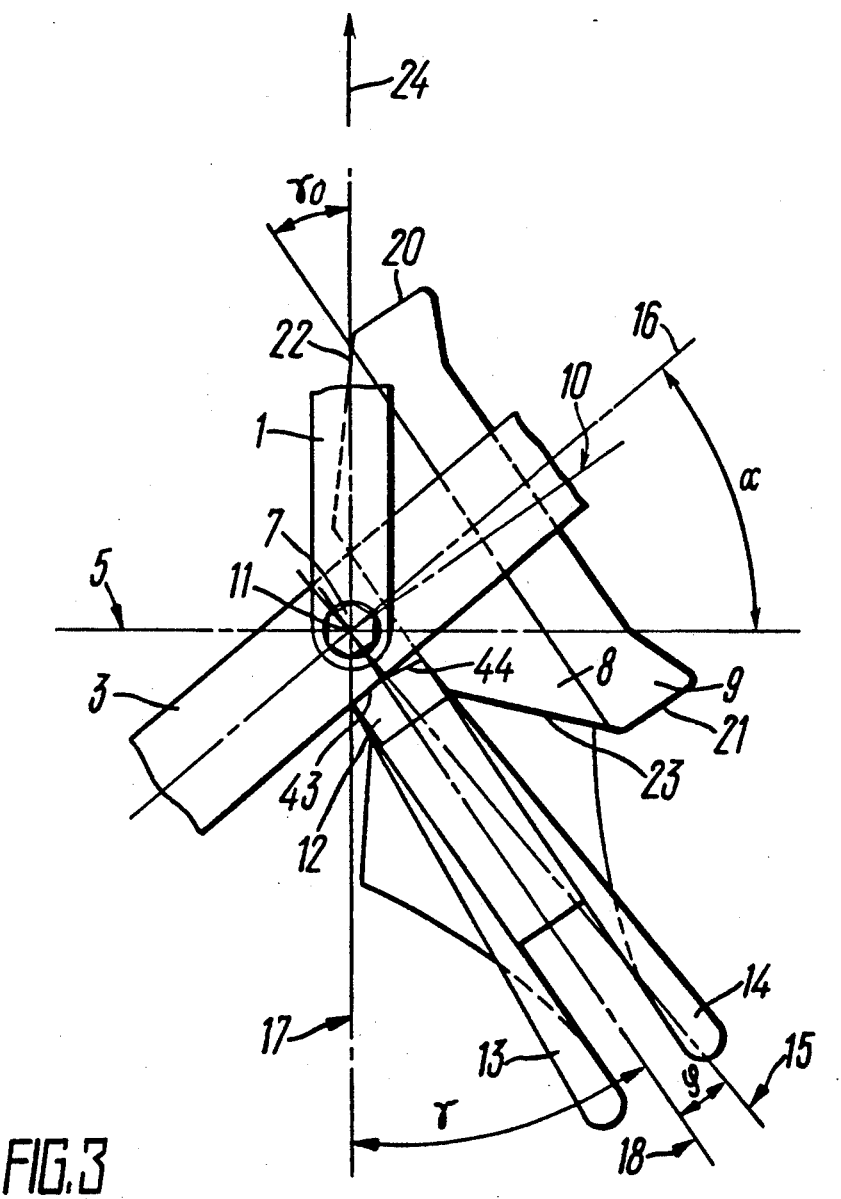
FIG. 3 is a plan view of a plow body having a rotatable rear part in the right-handed position.

FIGS. 3, 4 and 6 show that if the angle $\gamma_0$ of position of the share 9 with respect to the longitudinal vertical plane 17 (the furrow wall) is but slightly different from the angle $\alpha$, the rear part of the plow body can be mounted either for rotation (FIGS. 3 and 4) or rigidly (FIG. 6) relative to frame 3. In the former case, the angles $\gamma$ and $\alpha$ are different and in the latter case they are identical. It will be apparent from FIG. 6 that if the rear part of the plow body is rigidly secured, the left-handed rear part 13 of the moldboard and the right-handed rear part 14 of the moldboard are positioned at an angle with respect to each other (the angles $\gamma_0$ and $\gamma$ are different).

If the interbody clearance i.e. the longitudinal spacing between adjacent plow bodies along the frame 3, is determined only by the condition that the furrow slice should pass between the plow bodies (which is the case where moldboard jointers are used in the plow that do not pass through the top part of the furrow slice cut thereby into the furrow), or when fin cutters are used, the plow bodies may be arranged on the rotatable frame 3 with an interbody clearance which is less than the full length of the share 9. This full length is equal to b/Sin $\gamma_0$ (b is the plow body width; $\gamma_0$ is the angle of position of the share 9 with respect to the furrow wall). In this case, the simultaneous rotation of the front parts of the composite plow bodies is impossible because of jamming of the shares 9 so that their consecutive rotation is necessary which calls for a sophisticated actuator means. The actuator means can be made substantially simpler if the length the shares 9 are minimized, and the front parts of the plow bodies are rotated simultaneously.

Reducing the length of the share 9 to a value that is not greater than the interbody clerance requires either a change in configuration of the share 9 proper or a change in configuration of the front part 8 of the moldboard.

As can be seen from FIGS. 7-11, reducing the length 1 of the share 9 (from $1_1$ to $1_2$) while retaining the configuration of its lateral edges 20 and 21 and configuration of lateral edges 22 and 23 of the front part 8 of the moldboard results in a reduction of overhand L (from $L_1$ to $L_2$) of the front part 8 of the moldboard with the share 9 which is undesirable. In addition, a decrease in the length 1 of the share 9 results in an incomplete cutting of segments A and B of the furrow slice.

Figure 8:
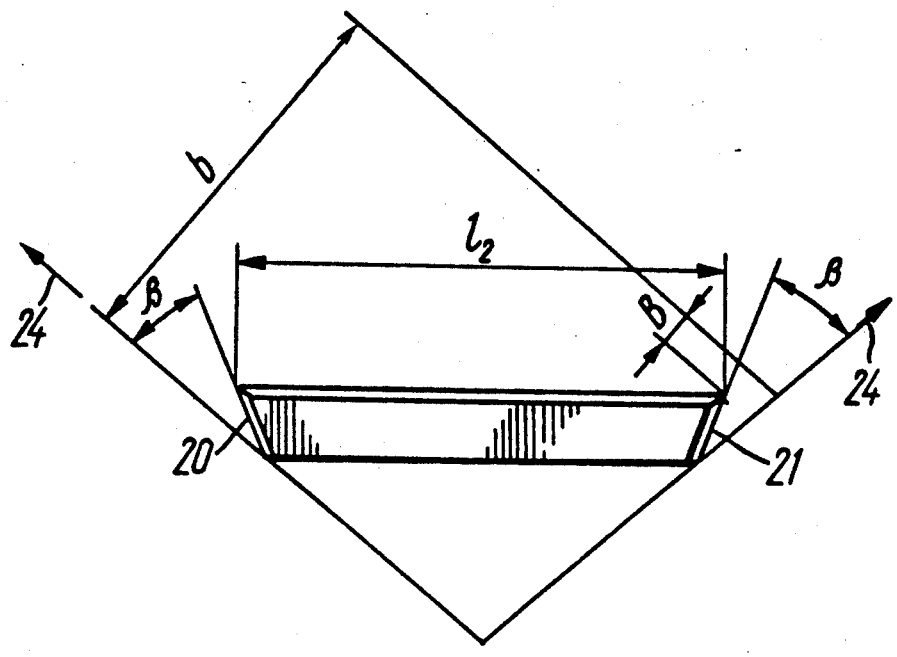
FIGS. 8, 9 and 10 are plan views showing various embodiments of a share.
Figure 9:
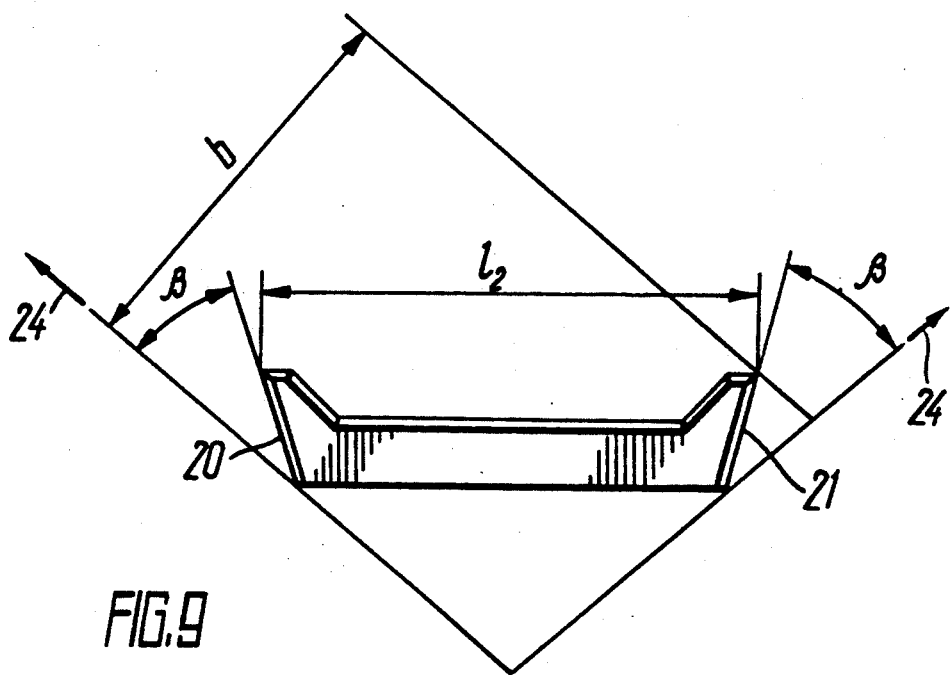
Figure 10:
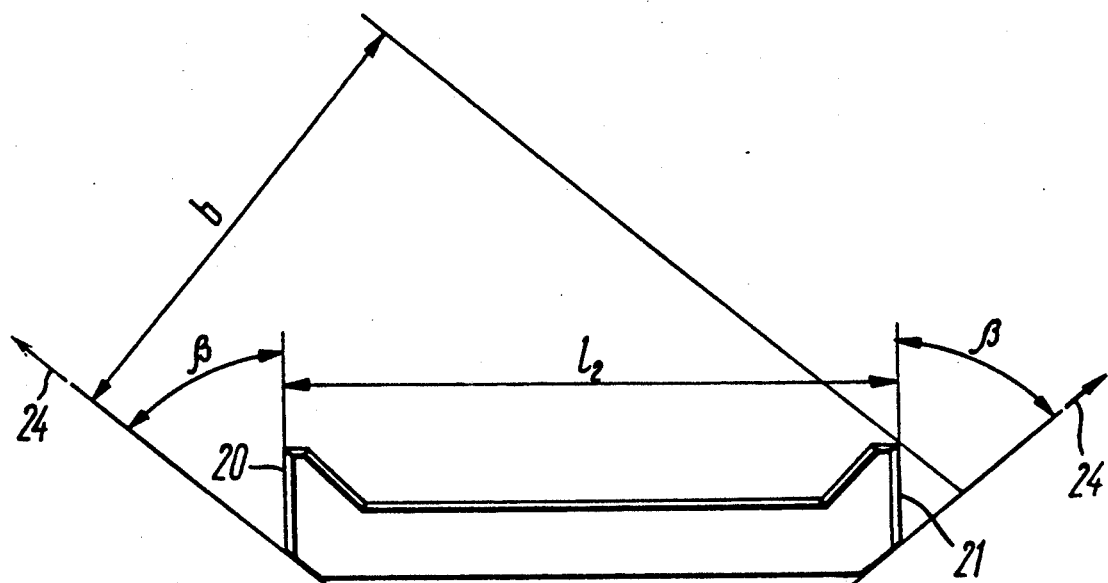

To retain the overhang L of the front part 8 of the moldboard with the share 9 and also to reduce and even eliminate incomplete cutting of the furrow slice using the shortened share 9, in the embodiment of the plow having composite plow bodies, the entire lateral edges 20 and 21 of the share 9 are cut back or truncated to be positioned at an angle $\beta$ with respect to the direction 24 of the plow movement and are sharpened (FIGS. 8, 9 and 10). This configuration of the share 9 makes it possible to reduce incomplete cutting of the furrow slice, by a factor of two or more (FIG. 8) and even eliminate it altogether (FIGS. 9 and 10).

Figure 11:
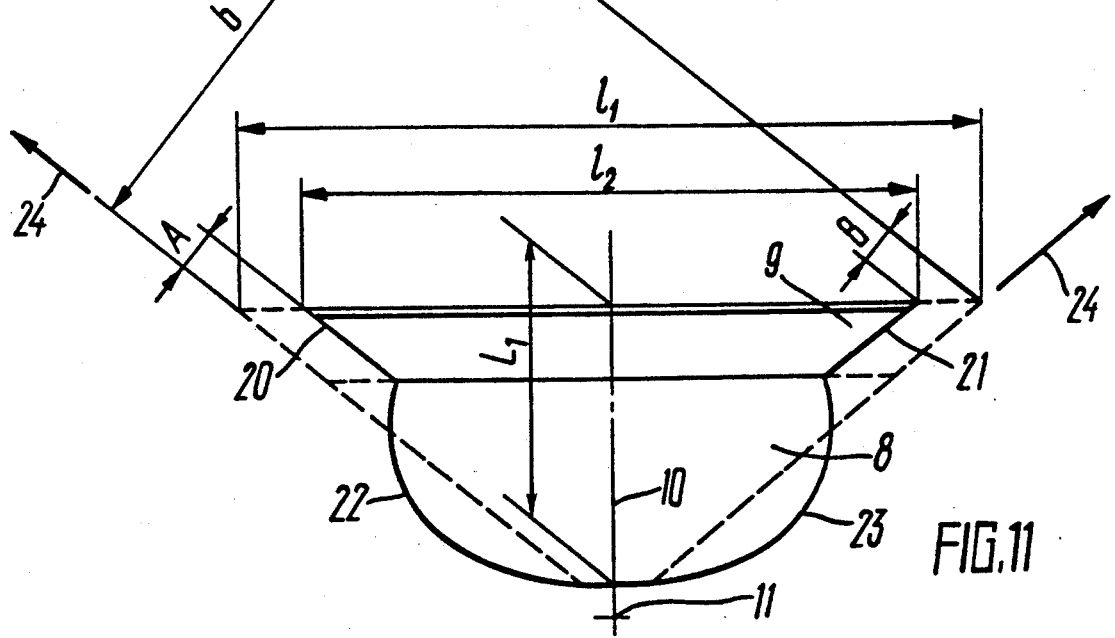
FIG. 11 is a plan view of an embodiment of the front part of a moldboard with a share.

In another embodiment of a plow having composite plow bodies, when incomplete cutting A and B of the furrow slice occurring upon a reduction of the length 1 of the share 9, does not have any effect on operation of the plow body, the overhang $L_1$ of the front part 8 with the share 9 can be retained and the lateral edges thereof 22 and 23 are in the form of convex curves (FIG. 11).

Figure 12:
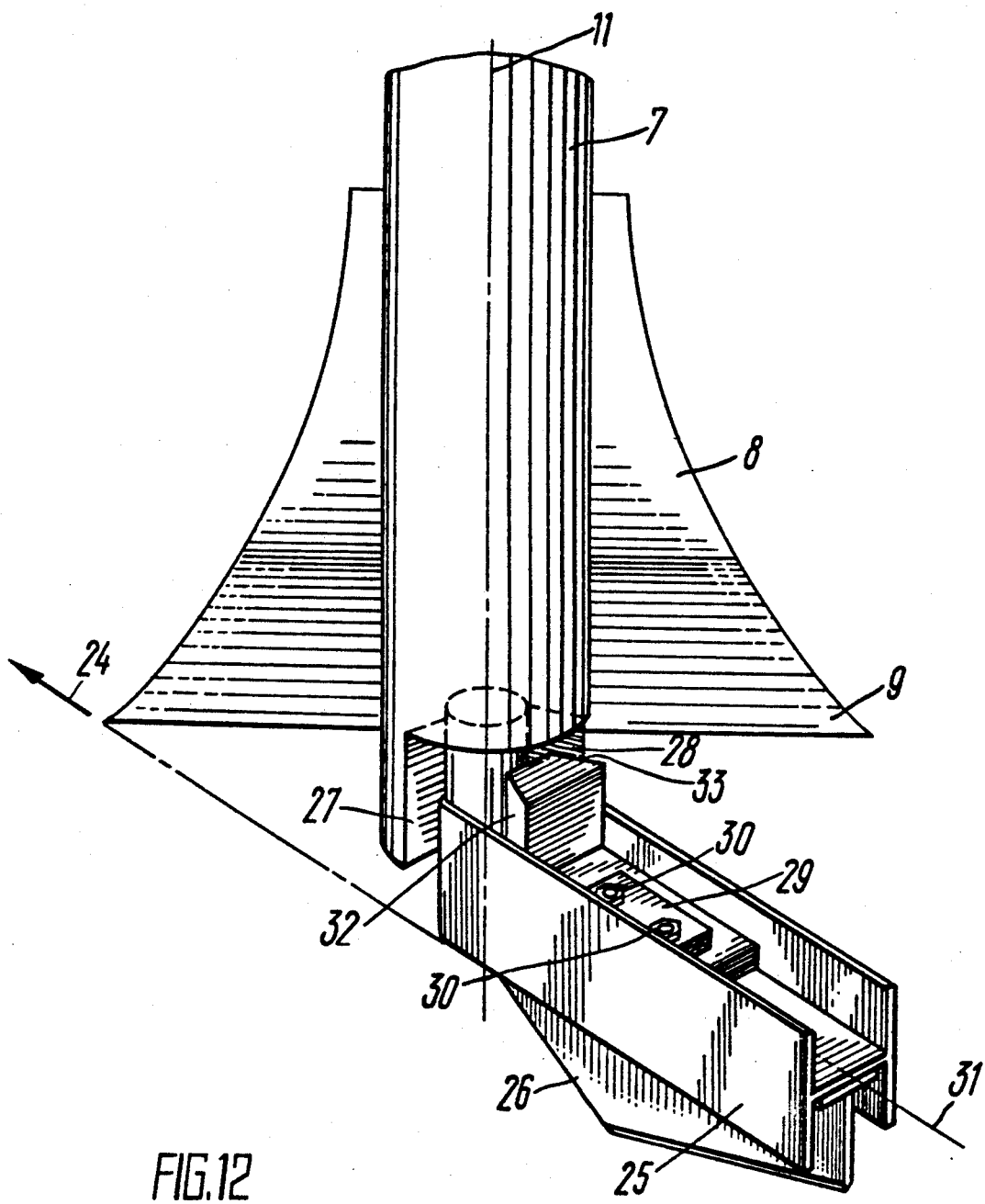
FIG. 12 is a perspective view of a front part of a plow body with a landside in the right-handed position.
Figure 13:
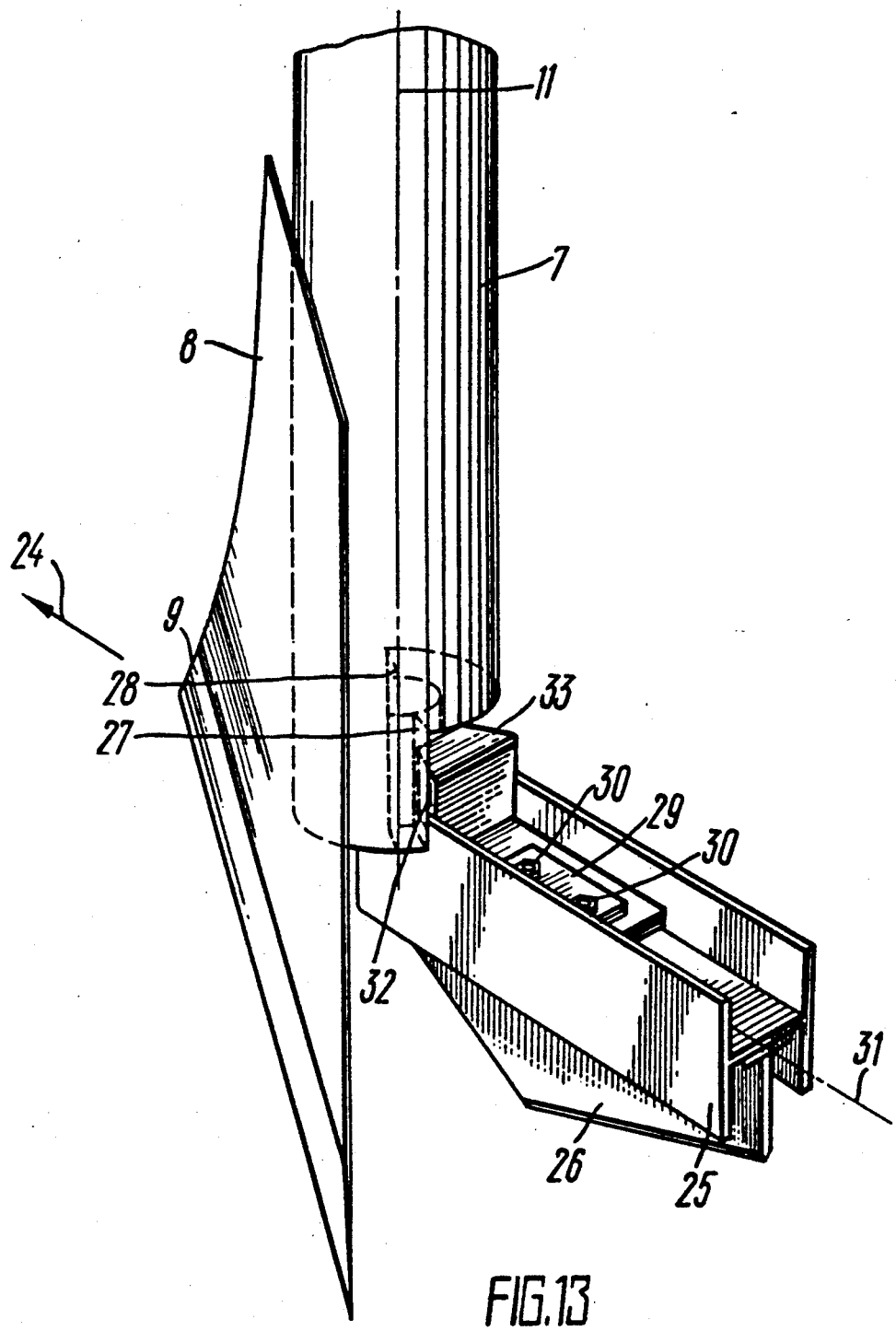
FIG. 13 is the plow body with a landslide of FIG. 12 for the left-handed position.

FIGS. 12 and 13 show one embodiment of the attachment of a landside 25, instead of leg (12) to the composite plow body, in which the landside is pivotally connected to the leg or post 7 in the front part of the plow body. A flat colter 26 can be attached to the landside 25. The leg or post 7 has abutments 27 and 28 designed for turning the landside 25 in the direction of movement 24 of the plow and for pressing it against the furrow wall alternately on the left and right. FIG. 12 shows the front part of the plow body in a position for the right-handed dumping of the furrow slice in which the leg or post is turned clockwise, and the abutment 28, having turned the landside 25 clockwise and set it in the direction of movement of the plow, acts upon the landside on the right-hand side, whereby the landside takes-up lateral forces acting on the plow body on the righthand side during operation of the plow. As shown in FIG. 13, the front part of the plow body is set to a position for the left-handed dumping of the furrow slice, in which the leg or post 7 is turned counterclockwise, and the abutment 27, having turned the landside 25 counterclockwise to set it in the direction of the plow movement, acts upon the landside on the lefthand side, whereby the landside takes-up lateral forces acting upon the plow body on the lefthand side during operation of the plow.

Figure 14:
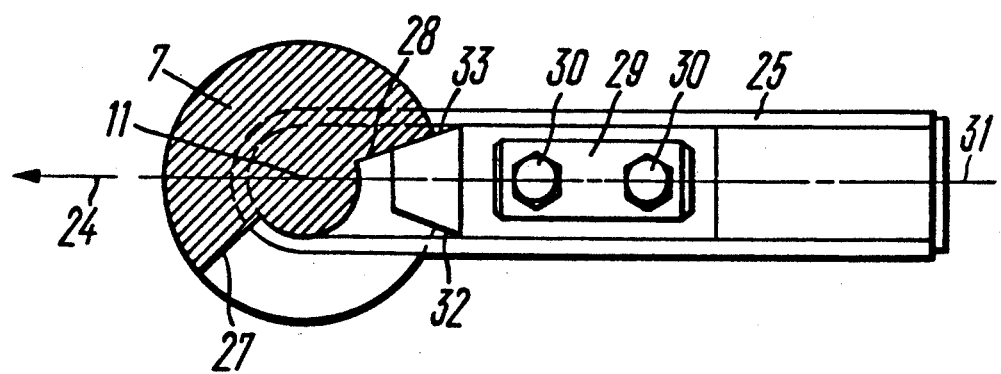
FIG. 14 is a plan view showing a leg of a front part of a plow body with a landside.

When the landside 25 works without the colter 26, it acts upon the furrow wall. In this case, soils differring in density and cohesion build up the necessary reaction force with different soil deformation (furrow wall deformation). To avoid skidding (out-of-straightness of movement) of the plow and to balance the lateral component of the force of resistance of the soil acting upon the plow body by means of the landside 25, it is necessary to install the landside at an angle with respect to the direction 24 of movement of the plow, the greater the deformation of the soil, the greater is the angle. The angle of the landside may be adjusted by means of a bar 29 which is fixed to the landside 25 by screws 30 and has its front-end portion engageable with the abutments 27 and 28 (FIGS. 12, 13 and 14). The bar 29 has elongated holes so that the position of the bar 29 along the longitudinal axis 31 can be adjusted during its attachment. Owing to the fact that forces 32 and 33 of the bar 29 engageable with the abutments 27 and 28 are symmetrical and are inclined with respect to the longitudinal axis 31 of the landside 25, the angle of position of the landside 25 with respect to the direction 24 of the plow movement can be varied by moving the bar 29 with respect to the landside 25.

Figure 15:
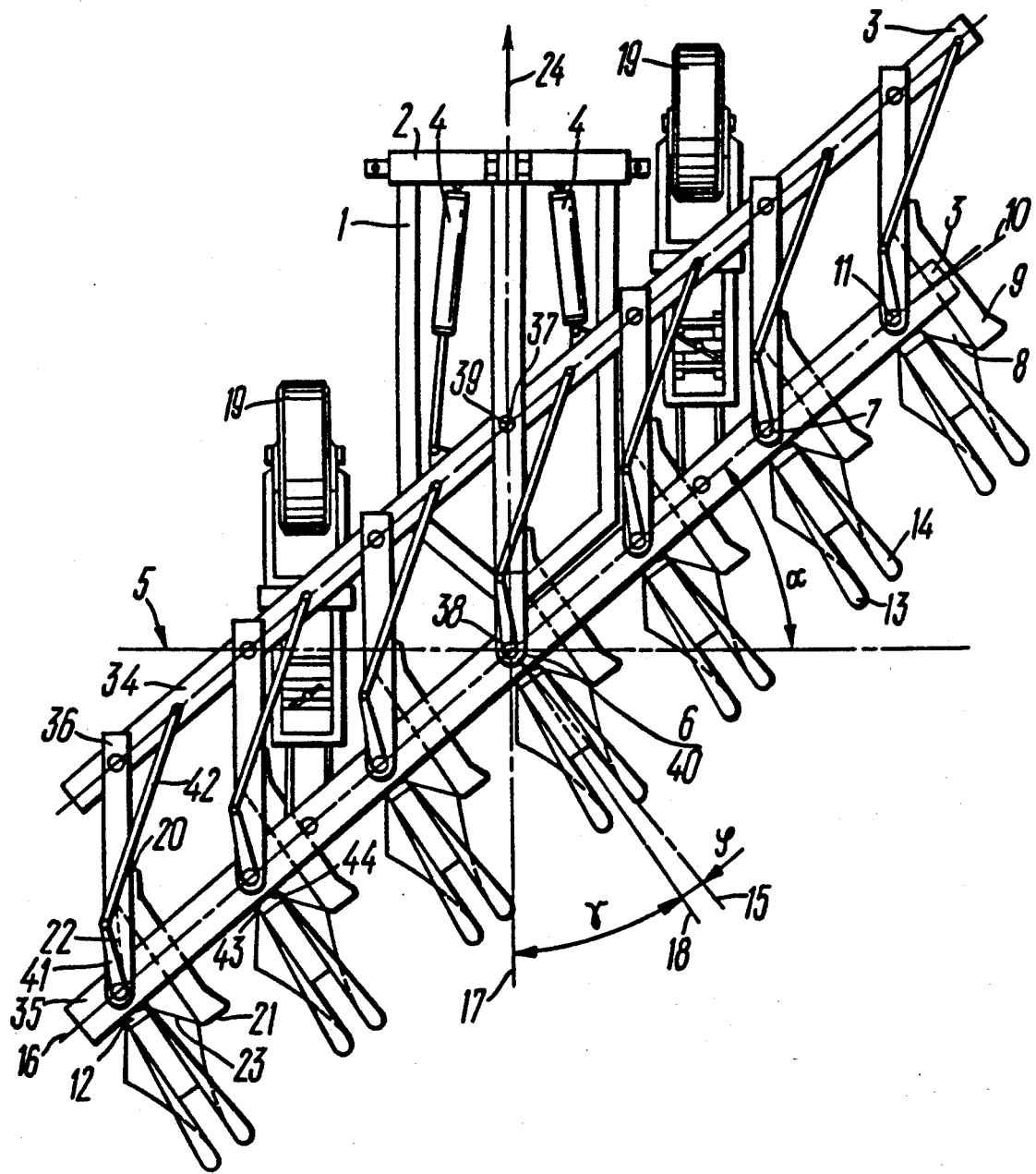
FIG. 15 is a plan view of a plow with a parallelogram frame in the right-handed position.

FIG. 15 shows an embodiment of the plow in which the rotatable frame 3 is in the form of a parallelogram linkage consisting of a front beam 34, a rear beam 35, and longitudinal links 36 pivotally interconnecting the beams 34 and 35. The parallelogram linkage is connected to the carrier frame 1 by means of pivot joints 37 and 38 and the hydraulic cylinders 4 or any another appropriate known means for moving the beams 34, 35 at one and the same angle $\alpha$ in either direction with respect to the transverse vertical plane 5 drawn through an axis 39 or 40 of rotation of the beam 34 or 35.

Plow bodies are attached to the rear beam 35, and when composite plow bodies are used, the rotatable leg or post 7 of the front part of each plow body is connected by means of an arm 41 and a pitman 42 to the front beam 34, the length of the share 9 being not greater than the interbody clearance along the axis 16 of the beam 35. The support wheels 19, colters and moldboard jointers (not shown in FIG. 15) are attached to one of the beams.

The moldboard jointers used in the plow have a symmetrical working surface which is similar to a surface of a dugfoot shovel of a cultivator or the front part of the composite plow body. In the former case the lag of the moldboard jointer is attached rigidly to the longitudinal link 36 and in the latter case it is pivotally mounted and is operatively connected to the links of the parallelogram linkage.

The plow bodies may also be mounted on the front beam 34, and in this case, if composite plow bodies are used, the arms 41 and the pitmans 42 connect the legs or posts of the front parts of the plow bodies with the rear beam 35.

The operative connection of one of the beams 34 and 35 of the frame with the legs 7 of the front parts of the plow bodies on the other beam 35 or 34 of the frame makes it possible, as mentioned above, to use the property of the parallelogram linkage which is capable of the changing distance between any points of the front beam 34 and rear beam 35 which are out of straight lines running in parallel with a horizontal line interconnecting the axes 39 and 40 of rotation of the beams 34 and 35.

Operation of the plow according to the invention will be described as applied to the lastmentioned embodiment.

When the plow moves on the field, its moldboard jointers cut off the top parts of the furrow slices and leave them behind on the land surface, and the plow bodies separate the furrow slices from the soil body, turn them upside down and place them into the furrows formed by the plow bodies moving ahead, the top parts of the furrow slices cut off by the moldboard jointers being displaced to the furrow bottom under gravity with the plants facing down. For a change in direction of dumping of the furrow slices, the alternation of the plow bodies is changed, and for that purpose, the frame is turned clockwise or counterclockwise by the hydraulic cylinders 4 at the angle $2\alpha$ in such a manner that the plow body on that side to which the furrow slices should be dumped is ahead in the direction of the plow movement. Simultaneously with rotation of the frame at the angle $2\alpha$, the front and rear parts of the plow bodies are set to the working positions. Each front part of the plow body is set to the working position by means of the beam 35, pitman 42 and arm 41 and each rear part of the plow body by means of the beam 35 and a means (not shown) turning it at the angle $\phi$ with respect to the vertical plane 15 or by means of the beam 35 and under the action of the furrow slice which turns the rear part at the angle $\phi$ until an abutment 43 or 44 of the rear part of the plow body comes in contact with the beam 35. During rotation of the frame and front parts of the plow bodies to the working positions, the landsides 25 (FIGS. 12, 13, 14) are set to the working position together with the pivotally mounted moldboard jointers. The plow moves over the field as a shuttle and upon each reversal of its direction of movement, the parallelogram linkage and the plow bodies are set from the left-handed position to the right-handed position, and vice versa.

INDUSTRIAL APPLICABILITY

The plow of the invention is intended to be used in agriculture for major tillage and is capable of replacing two-way and other plows for two-way plowing which carry out plowing with left- and right-hand dumping of the furrow slice during the plow shuttle movement. As the plow according to the invention is an integral-mounted plow, it is advantageous over a semintegral hiller plow which carries out one-way dumping of the furrow slices so that it can replace this plow as well.

We claim:

1. A plow comprising:
 a carrier frame (1);
 a horizontal turnable frame (3) mounted on said carrier frame (1) and having working members including left-handed and right-handed plow bodies attached thereto, said turnable frame (3) being constructed as a parallelogram mechanism comprising pivotally interconnected front and rear beams (34, 35), said plow bodies being secured on said rear beam in spaced relation therealong, and longitudinal links (36) interconnecting said beams (34, 35), said front and rear beams (34, 35) each being installed on the carrier frame (1) by means of a centrally arranged pivot (37, 38), said front and rear beams being pivotable in two directions to an angle (α) relative to a vertical-transverse plane (5) passing through an axis (39, 40) of one of the pivots (37, 38), means for pivoting said turnable frame including a drive means disposed on the carrier frame (1) and connected with one of said front and rear beams (34, 35);

each plow body comprising a front part including a post (7) rotatably connected with one of the beams (34, 35), and to said post is attached a symmetrical part (8) of a moldboard with a share (9) having a plane (10) of symmetry passing through a vertical axis (11) of rotation of said post (7), and a rear part including a leg (12) to which are attached left-handed and right-handed moldboards (13, 14) positioned in a mirror-like relation to each other, said leg (12) of said rear part being pivotally connected relative to the post (7) for swinging the left-handed and right-handed moldboards (13, 14) together in opposite directions, on mounting the parallelogram mechanism in a working position, through a vertical plane (15), normal to the beams (34, 35) to an angle $\phi = \alpha - \gamma$ from said vertical plane (15), wherein γ is the angle between a vertical-longitudinal plane (17) extending in the direction of travel (24) of the plow and a plane of symmetry (18) of the rear part of a plow body in said working position, the share (9) of the front part of each said plow body having sharpened side edges (20, 21) which are truncated to be inclined at an angle β relative to the direction of plow movement to reduce the length of said share (9) from a value b/sin γ₀, wherein b is the width of the untruncated share with respect to the direction of travel (24) and $\gamma_0$ is the angle of said share relative to the direction of travel (24) of the plow whereby the spacing between adjacent plow bodies, as measured along the length of the rear beam, is minimized.

2. A plow as claimed in claim 1, wherein said side edges of said share (9) are truncated substantially along the entire length of said side edges.

3. A plow as claimed in claim 1, wherein each plow body has a landside (25) pivotally connected to said post which includes two stops (27, 28) for turning said landside to a preset position.

4. A plow as claimed in claim 1 comprising a mechanism for rotation of said plow bodies including connecting rods (42) mounted on one of the beams (34, 35) and connected to the other beam (35 or 34) by means of levers (41) mounted on said posts (7), the connecting rods (42) and levers (41) extending in planes at an angle to longitudinally extending planes connecting axes (40 and 39) of rotation of the front beam (34) and the rear beam (35).

5. A plow comprising:

a carrier frame (1);

a horizontal turnable frame (3) mounted on said carrier frame (1) and having working members including left-handed and right-handed plow bodies attached thereto, said turnable frame (3) being constructed as a parallelogram mechanism comprising pivotally interconnected front and rear beams (34, 35), said plow bodies being secured on said rear beam in spaced relation therealong and longitudinal links (36) interconnecting said beams (34, 35), said front and rear beams (34, 35) each being installed on the carrier frame (1) by means of a centrally arranged pivot (37, 38), said front and rear beams being pivotable in two directions to an angle (α) relative to a vertical-transverse plane (5) passing through an axis (39, 40) of one of the pivots (37, 38), means for pivoting said turnable frame including a drive means disposed on the carrier frame (1) and connected with one of said front and rear beams (34, 35);

each plow body comprising a front part including a post (7) rotatably connected with one of the beams (34, 35), and to said post is attached a symmetrical part (8) of a moldboard with a share (9) having a plane (10) of symmetry passing through a vertical axis (11) of rotation of said post (7), and a rear part including a leg (12) to which are attached left-handed and right-handed moldboards (13, 14) positioned in a mirror-like relation to each other, said leg (12) of said rear part being pivotally connected relative to the post (7) for swinging the left-handed and right-handed moldboards (13, 14) together in opposite directions, on mounting the parallelogram mechanism in a working position, through a vertical plane (15), normal to the beams (34, 35) to an angle $\phi = \alpha - \gamma$ from said vertical plane (15), wherein γ is the angle between a vertical-longitudinal plane (17) extending in the direction of travel (24) of the plow and a plane of symmetry (18) of the rear part of a plow body in said working position, the symmetrical part (8) of the moldboard of said front part of each said plow body having lateral edges (22, 23) of convex shape enabling the share associated with said moldboard to be reduced in length (1) while the overhang (L) of the symmetrical part (8) is maintained.

* * * * *